United States Patent
Drepper

(10) Patent No.: US 11,593,156 B2
(45) Date of Patent: Feb. 28, 2023

(54) INSTRUCTION OFFLOAD TO PROCESSOR CORES IN ATTACHED MEMORY

(71) Applicant: RED HAT, INC., Raleigh, NC (US)

(72) Inventor: Ulrich Drepper, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 526 days.

(21) Appl. No.: 16/542,596

(22) Filed: Aug. 16, 2019

(65) Prior Publication Data

US 2021/0049039 A1    Feb. 18, 2021

(51) Int. Cl.
*G06F 9/48* (2006.01)
*G06F 9/50* (2006.01)
*G06F 9/34* (2018.01)
*G06F 9/30* (2018.01)

(52) U.S. Cl.
CPC ........ *G06F 9/4856* (2013.01); *G06F 9/30145* (2013.01); *G06F 9/34* (2013.01); *G06F 9/505* (2013.01); *G06F 9/5016* (2013.01)

(58) Field of Classification Search
CPC ...... G06F 9/4856; G06F 9/30145; G06F 9/34; G06F 9/5016; G06F 9/505; G06F 9/3836; G06F 9/5044; G06F 9/5066; G06F 9/5088; G06F 9/5083; G06F 9/5038; G06F 9/4843; G06F 9/4806; G06F 9/4862; G06F 9/4881; G06F 9/3877; G06F 2209/509; G06F 2009/3883; G06F 15/7889
USPC ............ 718/102–108; 712/3, 7, 31, 34, 241
See application file for complete search history.

(56) References Cited

U.S. PATENT DOCUMENTS

| | | | |
|---|---|---|---|
| 6,678,021 B2 | 1/2004 | Ohkawa | |
| 9,959,202 B2 | 5/2018 | van Lunteren et al. | |
| 2004/0250045 A1 | 12/2004 | Dowling | |
| 2005/0151996 A1* | 7/2005 | Koike | H04N 1/00915 358/1.15 |
| 2006/0069832 A1* | 3/2006 | Imaizumi | G06F 13/4217 710/110 |
| 2007/0250681 A1* | 10/2007 | Horvath | G06F 9/3877 712/4 |
| 2008/0163183 A1* | 7/2008 | Li | G06F 8/456 717/149 |
| 2009/0300642 A1* | 12/2009 | Thaler | G06F 9/4881 718/105 |
| 2016/0092238 A1* | 3/2016 | Codrescu | G06F 9/30036 712/200 |
| 2016/0147667 A1 | 5/2016 | Awasthi et al. | |

* cited by examiner

OTHER PUBLICATIONS

Amin Ghasemazar et al. "Embedded Complex Floating Point Hardware Accelerator" (Year: 2014).*

*Primary Examiner* — Jacob Petranek
(74) *Attorney, Agent, or Firm* — Lowenstein Sandler LLP

(57) ABSTRACT

An instruction offload manager receives, by a processing device, a first request to execute a program, identifies one or more instructions of the program to be offloaded to a second processing device, where the second processing device includes a same instruction set architecture as the processing device, and provides the one or more instructions to a memory module comprising the second processing device. Responsive to detecting an indication to execute the one or more instructions, the instruction offload manager provides an indication to the second processing device to cause the second processing device to execute the one or more instructions, the one or more instructions to update a portion of a memory space associated with the memory module.

19 Claims, 7 Drawing Sheets

INSTRUCTION OFFLOAD TO PROCESSOR CORES IN ATTACHED MEMORY

TECHNICAL FIELD

The present disclosure is generally related to computer systems, and more particularly, to instruction offload to processors in attached memory for computer systems.

BACKGROUND

Advances in computer technologies have led to system implementations where the primary CPU can become burdened with increasing workloads. In such cases, CPU utilization can often suffer due to increasing responsibility for performing operations, as well as bottlenecks that can occur when transferring data from stored memory to a waiting CPU. Instruction offloading seeks to mitigate these bottlenecks by performing dedicated functions on data wherever the data is located.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
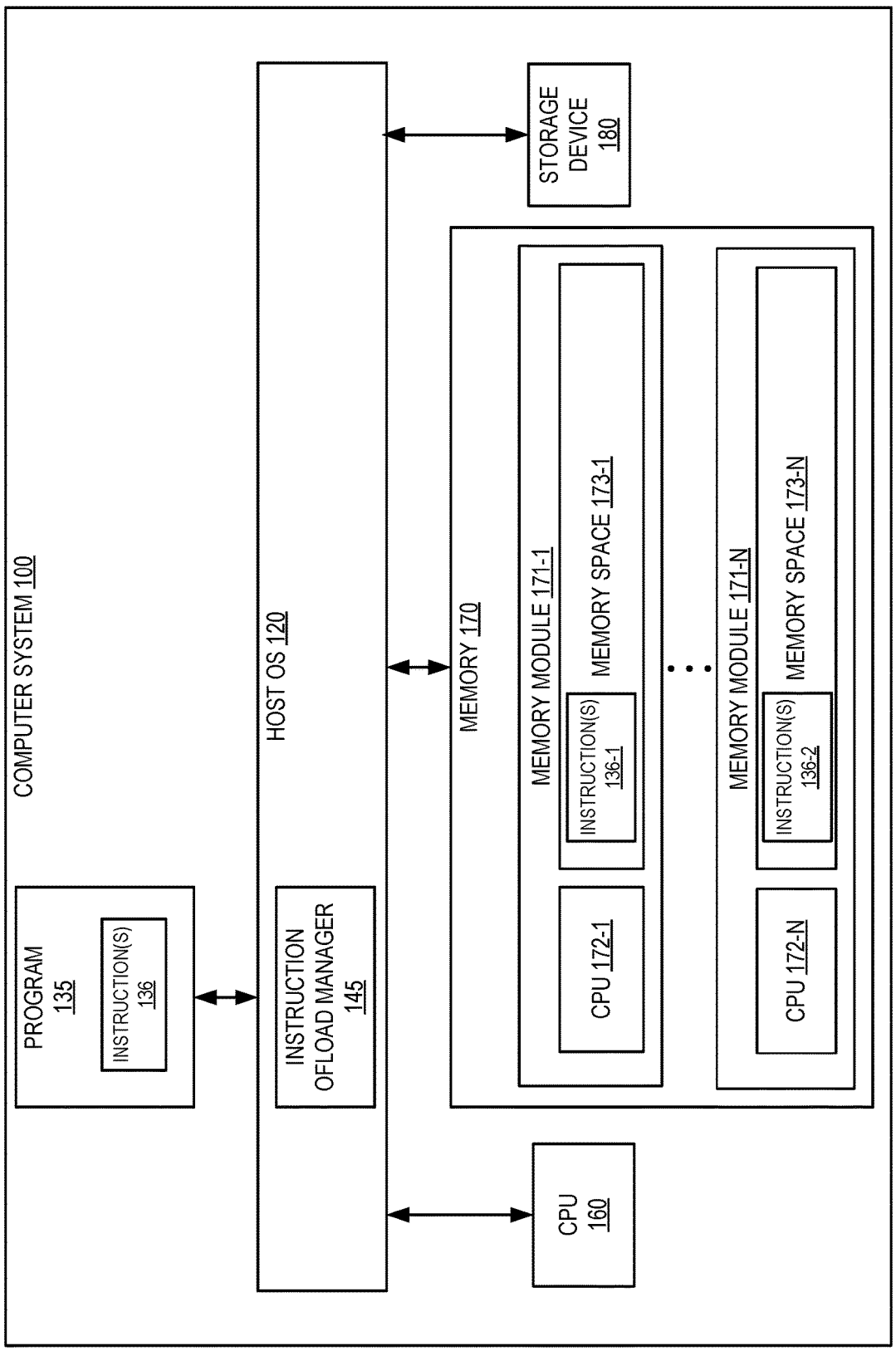
FIG. 1 depicts a high-level component diagram of an example computer system architecture, in accordance with one or more aspects of the present disclosure.

Described herein are methods and systems for implementing an instruction offload manager to facilitate instruction offload to processors in attached memory. Instruction offload can mitigate performance bottlenecks experienced by modern CPUs by performing operations on data closer to where the data is actually stored. Since modern CPUs can perform instructions significantly faster than data can be transferred across a communication connection, CPUs often remain idle while waiting for the data to be processed. Additionally, the amount of energy needed to move the data from a memory cell to the CPU can often dwarf the energy consumption for the operation itself. Offloading instructions performed on data can eliminate these bottlenecks, reducing both CPU idle time and energy used in the transfer of data.

Some conventional systems implement instruction offloading by using specialized processors that are located closer to the actual data. In such implementations, the processors are often configured to perform specific operations and are thus capable of a narrow range of functionalities. Thus, these types of solutions may only be able to provide limited benefits to executing programs. Additionally, these implementations often utilize processors that are configured with a different instruction set architecture than that of the primary CPU. Thus, a program compiled to execute on the primary CPU may not be able to offload many of its functions to another CPU that does not use a similar architecture. In these cases, the benefits of offloading may be limited and harder to achieve. Similarly, some conventional systems incorporate translating host code to a format understood by the offload engine. This, however, may not provide performance improvements even if the host code is optimized, and can typically be a complex process that is not easily performed by hardware and on the fly.

Aspects of the present disclosure address the above noted and other deficiencies by implementing an instruction offload manager to facilitate the offloading of instructions to processors in attached memory. In various implementations, the instruction offload manager can identify instructions to be offloaded to memory modules that include embedded CPUs that are configured with the same instruction set architecture as the main CPU. Thus, actual instructions of executing programs can be offloaded to memory modules storing the data that needs to be modified. Accordingly, any program instruction that can benefit from offloading can be targeted rather than only the pre-configured functions of conventional methods for offloading and acceleration. Additionally, in various implementations, the instruction offload manager can determine which instructions are to be offloaded either prior to program execution or dynamically at the time of execution based on the instruction type. Thus, the offloading process can be configured specific to each program rather than specific to the pre-configured functionality of an offload processor. In various implementations, the instruction offload manager can be embedded into the CPU or partially implemented in the OS and the CPU.

Aspects of the present disclosure present advantages over conventional solutions with respect to the issues noted above. These advantages include, but are not limited to, improved energy consumption and CPU utilization with a significant reduction in bottlenecks, and simpler configuration and programming of the offload engine. First, since the instruction offload manager can use the actual instructions making up the program (rather than code compiled for an offload CPU), the benefits of offloading with respect to both data transfer and energy utilization can be dramatically improved for many programs, not just those specially prepared for offloading. Moreover, since the instruction offload manager can make offloading determinations either prior to execution or at execution time, performance benefits can be maximized on a per-program basis without utilizing significant resources on program pre-configuration.

FIG. 1 is a block diagram of a computer system architecture 100 in which implementations of the disclosure may operate. In some implementations, the system architecture 100 may be used in a containerized computing services platform. Although implementations of the disclosure are described in accordance with a certain type of system, this should not be considered as limiting the scope or usefulness of the features of the disclosure. For example, the features and techniques described herein can be used with other types of computer systems and/or computing services platforms.

As shown in FIG. 1, the computer system 100 can include one or more central processing units (CPU) 160, memory 170, which may include volatile memory devices (e.g., random access memory (RAM)), non-volatile memory devices (e.g., flash memory) and/or other types of memory devices, and one or more storage devices 180 (e.g., one or more magnetic hard disk drives, a Universal Serial Bus [USB] solid state drive, a Redundant Array of Independent Disks [RAID] system, a network attached storage [NAS] array, etc.). In certain implementations, memory 170 may be non-uniform access (NUMA), such that memory access time depends on the memory location relative to CPU 160.

In some implementations, memory 170 may include one or more memory modules 171-1 through 171-N, where N is a positive integer. Memory modules 171 can be memory components that include a memory space 173 operatively coupled to an embedded CPU 172. As discussed in further detail below, the CPU 172 can be utilized to perform operations on the associated memory space 173 without transferring data from memory 170 to CPU 160. In some implementations, CPU 172 can include the same instruction set architecture (ISA) as CPU 160. In other words, CPU 172 can be the same type of processing device as CPU 160 and perform the same type of arithmetic and logic operations as CPU 160. In some implementations, CPU 172 may be a reduced instruction set (RISC) processing device that can perform the same arithmetic and logic operations as CPU 160.

The computer system 100 may be a server, a mainframe, a workstation, a personal computer (PC), a mobile phone, a palm-sized computing device, etc. It should be noted that although, for simplicity, a single CPU 160 is depicted in FIG. 1, in some other embodiments computer system 100 may comprise a plurality of CPUs 160. Similarly, in some other embodiments computer system 100 may comprise a plurality of storage devices 180, rather than a single storage device 180.

Computer system 100 may additionally include one or more programs 135 and host operating system (OS) 120. Host OS 120 manages the hardware resources of the computer system and provides functions such as inter-process communication, scheduling, memory management, and so forth. Programs 135 may be software applications running on CPU 160. As shown, programs 135 can include one or more instructions 136 to perform various operations within computer system 100.

Host OS 120 may additionally include an instruction offload manager 145 that can facilitate the offloading of instructions performed by program 135. In some implementations, instruction offload manager 145 can analyze a program 145 prior to execution (or as the program is initially loaded for execution) to determine whether any instruction can be offloaded to one of memory modules 171. In such instances, instruction offload manager 145 can identify metadata stored within program 135 that identifies particular instructions 136 that can be offloaded for execution by an embedded CPU 172 of a memory module 171. Instruction offload manager 145 can determine the memory space(s) 173 that may be updated by the instructions 136 and provide the instructions 136 to the memory modules that include the data updated by the program. In some implementations, instruction offload manager 145 can send copies of the instructions 136 (e.g., instructions 136-1 and 136-2) to the involved memory modules. In some implementations, CPU 160 may be configured to initiate execution of the instructions 136-1 and 136-2 on the respective CPUs 172-1 and 172-2 if the control flow of CPU 160 reaches instruction 136. It should be noted, that while FIG. 1 depicts instruction offload manager 145 as being included in Host OS 120, in some implementations, instruction offload manager 145 may be included in CPU 160, and may facilitate the offloading as described herein without the involvement of the Host OS 120.

In some implementations, instruction offload manager 145 can determine whether any instruction can be offloaded to one of memory modules 171 dynamically while the program is executing. In such instances, instruction offload manager can analyze the executing instruction and make the determination in view of attributes of the instruction (e.g., the instruction type, the amount of memory being updated, the number of iterations performed by the instruction, etc.). Instruction offload manager 145 can then offload the instructions to the involved memory modules 171 to be executed by the associated CPU 172.

Implementing the instruction offload manager 145 to facilitate instruction offload prior to program execution is described in further detail below with respect to FIG. 2. Implementing the instruction offload manager 145 to facilitate instruction offload dynamically at execution time is described in further detail below with respect to FIG. 3.

Figure 2:
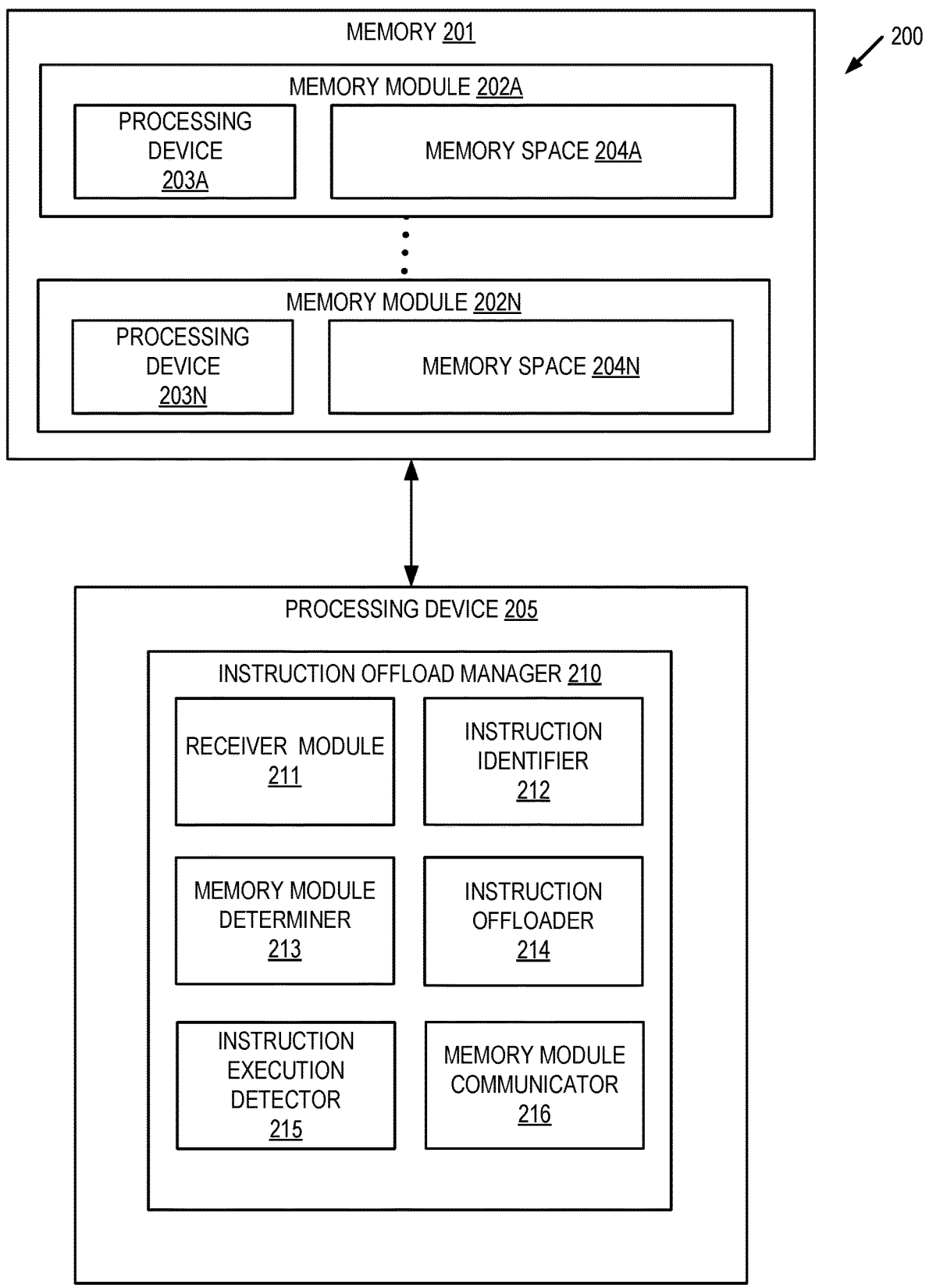
FIG. 2 depicts a block diagram illustrating an example of an instruction offload manager for facilitating instruction offload prior to program execution, in accordance with one or more aspects of the present disclosure.

FIG. 2 depicts a block diagram illustrating an example of an instruction offload manager 210 for facilitating instruction offload prior to program execution. In some implementations, instruction offload manager 210 may correspond instruction offload manager 145 of FIG. 1. As shown in FIG. 2, instruction offload manager 210 may be a component of a computing apparatus 200 that includes a processing device 205, operatively coupled to a memory 201, to execute instruction offload manager 210. In some implementations, processing device 205 and memory 201 may correspond to processing device 702 and main memory 704 respectively as described below with respect to FIG. 7.

In some implementations, memory 201 may include one or more memory modules 202A-202N. Each memory module 202 can include an embedded secondary processing device 203 and a corresponding memory space 204. Thus, the secondary processing device 203 can be operatively coupled to the memory space 204 of the corresponding memory module 202. In some implementations, the secondary processing device 203 can support the same instruction set architecture (ISA) as processing device 205. Thus, instructions of programs executing on processing device 205 can be offloaded (e.g., copied) to one of processing devices 203 without modification to the instructions themselves. In other words, an instruction offloaded to a processing device 203 can operate on a corresponding memory space 204 as if it were executing on processing device 205.

Instruction offload manager 210 may include receiver module 211, instruction identifier 212, memory module determiner 213, instruction offloader 214, instruction execution detector 215, and memory module communicator 216. Alternatively, the functionality of one or more of receiver module 211, instruction identifier 212, memory module determiner 213, instruction offloader 214, instruction execution detector 215, and memory module communicator 216 may be combined into a single module or divided into multiple sub-modules.

Receiver module 211 is responsible for receiving requests to load and subsequently execute a program (or instructions of a program). In some implementations, receiver module 211 can receive the request from the operating system, an application program, a system component, or the like.

Responsive to receiving the request, receiver module 211 can initiate a loading process to load the program into memory 201 and prepare the program for execution. For example, receiver module 211 can initiate preliminary configuration operations to prepare areas of memory 201 for execution of the program. In some implementations, responsive to receiving the request, and prior to initiating execution of the program, receiver module 211 can subsequently invoke instruction identifier 212.

Instruction identifier 212 is responsible for identifying one or more instructions of the program that can be offloaded to a secondary processing device 203A-N embedded within one of memory modules 202A-N. As noted above, an instruction can be offloaded in instances where the instruction performs repetitive operations on large amounts of data stored on memory modules 202A-N. In various embodiments, instructions eligible for offloading can include arithmetic operations, logic operations, or the like. These types of instructions can be offloaded to a processing device 203A-N that is coupled to the same memory module as the memory space being operated on by the particular instruction. Thus, the processing device 203A-N can execute the instructions on the associated memory space 203 without transferring data to processing device 205.

In some implementations, as noted above, instruction identifier 212 may be invoked when the program is initially loaded and prior to execution. Instruction identifier 212 can analyze attributes of the program to determine whether or not the program includes instructions that can be offloaded to one of processing devices 203A-N. For example, instruction identifier 212 can analyze the program to identify embedded metadata information associated with any instruction that can be offloaded to a secondary processing device that is embedded in a memory module. In some implementations, this metadata information can be generated by a compiler that can identify instructions eligible for offloading. For example, a "hint" instruction can be included in the binary code of the program to identify other instructions that that can be offloaded. Thus, instructions within the program that can be offloaded to a memory module 202A-N can be identified prior to initiating execution of the program.

In some implementations, the metadata can include information describing the number of times an associated instruction is executed. If the number of operations meets a threshold condition, instruction identifier 212 can target those instructions for offloading. For example, an instruction (or set of instructions) configured to execute for a large number of iterations (e.g., a loop) against a particular set of data can be identified as eligible for offloading. Similarly, the metadata can include information describing the amount of memory (e.g., the amount of data stored in adjacent memory addresses) modified by the associated instructions. If the amount of memory satisfies a threshold amount, instruction identifier 212 can target those instructions for offloading. For example, an instruction (or set of instructions) configured to operate on a large number of memory addresses, or a number of contiguous memory addresses (e.g., data that is striped across addresses in the same memory module) can be identified as eligible for offloading.

Memory module determiner 213 is responsible for determining an appropriate memory module 202 to which to offload the identified instructions. In some implementations, memory module determiner 213 can use the metadata information identified by instruction identifier 212 to determine the appropriate memory module 202. In an illustrative example, memory module determiner 213 can first determine the area of memory 201 updated by the instructions identified as eligible for offloading. Subsequently, memory module determiner 213 can determine one or more of the memory modules 202 that are associated with at least a portion of the identified memory area.

In one illustrative example, memory module determiner 213 can translate the logical addresses of the memory area updated by the instructions to a physical address associated with one or more of memory spaces 204. Memory module determiner 213 can subsequently identify the memory modules 202 associated with the applicable memory spaces 204 (e.g., the memory spaces 204 associated with the memory area updated by the instructions to be offloaded). Once the appropriate memory module has been identified, instruction offloader 214 may then be invoked to initiate the instruction offload process. In some implementations, memory module determiner 213 may identify more than one memory module 202 that stores data updated by the instructions to be offloaded. In such instances, memory module determiner 213 may target each of the applicable memory modules 202 to receive copies of the offloaded instructions for execution by the corresponding processing device 203.

In another illustrative example, memory module determiner 213 can provide the additional information to each of the processing devices 203 which allows the processing devices 203 to translate the addresses used by the instructions to physical addresses. In such cases, the applicable offloaded instruction can be invoked by the associated processing deice 203 without modifying the instruction. In some implementations, the additional information may be included in a page table tree (or partial page table tree) as it is used for executing the program on the processing device 205.

Instruction offloader 214 is responsible for providing the identified instructions (e.g., the instructions eligible for offloading to one of memory modules 202) to the appropriate memory module 202 for subsequent execution by that memory module's corresponding processing device 203. In some implementations, instruction offloader 214 can provide the instructions to the memory module 202 by copying the instructions to an area of memory space 204 for that memory module 202. For example, memory module 202 can be configured such that memory space 204 includes a dedicated area for offloaded program instructions with the remainder of the memory space 204 available for other uses. In other implementations, instruction offloader 214 can send a memory location to the memory module 202 that identifies where the instructions are stored. The memory module 202 can then store the memory location for later use. For example, memory module 202 can subsequently fetch the instructions and store them locally, or alternatively, execute the instructions from the received memory location.

In some implementations, instruction offloader 214 can modify the area of memory storing the program (e.g., memory 201, a cache area where the program is loaded, etc.) to indicate whether particular instructions have been offloaded. For example, a register or memory address associated with the offloaded instructions can be modified to indicate to the main program that those instructions should execute on one or more of processing devices 203 rather than processing device 205. Thus, when the program encounters those instructions, control may be transferred to the appropriate memory module 202. In some implementations, once the instructions have been offloaded, instruction offload manager 210 can initiate execution of the program (or provide a notification to the operating system to initiate execution of the program).

Instruction execution detector 215 is responsible for detecting the execution of the offloaded instructions while the program is executing. In some implementations, as noted above, a reference associated with the memory storing the program instructions (e.g., an address in a memory cache) can be modified such that an attempt to execute an offloaded instruction (or instructions) can to notify instruction offload manager 215 (e.g., by generating a trigger, alert, notification, interrupt, etc.). Subsequently, instruction execution detector 215 can detect the notification and initiate execution of the instruction (or instructions) on the appropriate memory modules 202. In other implementations, instruction execution detector 215 can receive a specific request (e.g., from the program, from the operating system, etc.) to initiate execution of the instruction(s) on the appropriate memory modules 202.

Memory module communicator 216 is responsible for communicating with the memory modules 202 to initiate execution of any offloaded instructions as well as receiving responses that indicate the success or failure of the execution of those instructions as well as state changes (e.g., register content). In some implementations, memory module communicator 216 can send a notification to the processing device 203 of the applicable memory modules 202 to cause the processing device 203 to execute the offloaded instructions. As noted above, processing device 203 can execute the offloaded instructions to update the corresponding memory space 204 for that memory module 202. For example, if the instruction identifier 212 had determined that the instructions should be offloaded to two memory modules 202A and 202B based on the analysis of the program, memory module communicator 212 can send notifications to both memory modules such that processing device 203A can execute the offloaded instructions to update memory space 204A, and processing device 203B can execute the offloaded instructions to update memory space 204B.

In some implementations, memory module communicator 216 can send the notification by sending a request to the processing device 203 for the appropriate memory module 202 to execute the offloaded instructions. Alternatively, memory module communicator 216 can modify an area of memory that is accessible by the memory module 202 that causes the processing device 203 to execute the offloaded instructions. For example, memory module communicator 216 can modify a memory address that is monitored by each of the processing devices 203 to signal when to execute the offloaded instructions. In some implementations, each offloaded instruction may be associated with a separate memory address so that the instructions can be managed independently. In such cases, the memory address can be a flag set to execute or not. Alternatively, a single memory area may be used to indicate which instruction or instructions to execute as well as the memory addresses to be operated upon by the instructions. In other implementations, memory module communicator 216 can send a notification to the processing device 203 that indicates a starting address of the data to be updated by the offloaded instruction as well as an amount of data to update (e.g., a list of addresses to process, a number of data items to process, etc.).

Memory module communicator 216 can additionally receive responses from any of the memory modules 202 that indicate the status of the offloaded instructions. For example, if the instructions complete execution successfully, memory module communicator 216 may receive a notification from the appropriate processing device 203 that indicates that the offloaded instructions have been executed. Alternatively, memory module communicator 216 may detect that a memory address associated with the execution status of the instructions has been updated by the applicable processing device 203. Instruction offload manager 210 may subsequently indicate to the main program that the offloaded instructions have completed so that execution can continue.

In some implementations, instruction offload manager 210 may take additional action if the offloaded instructions should fail to execute. In various implementations, the offloaded instructions may fail to execute because of a data related problem, a communication problem, because the processing device 203 was busy executing another task, or the like. Responsive to receiving a notification from a processing device 203 that the offloaded instructions cannot be executed by that processing device, instruction offload manager 210 can indicate to the main program that the offloaded instructions are to be executed by processing device 205.

Figure 3:
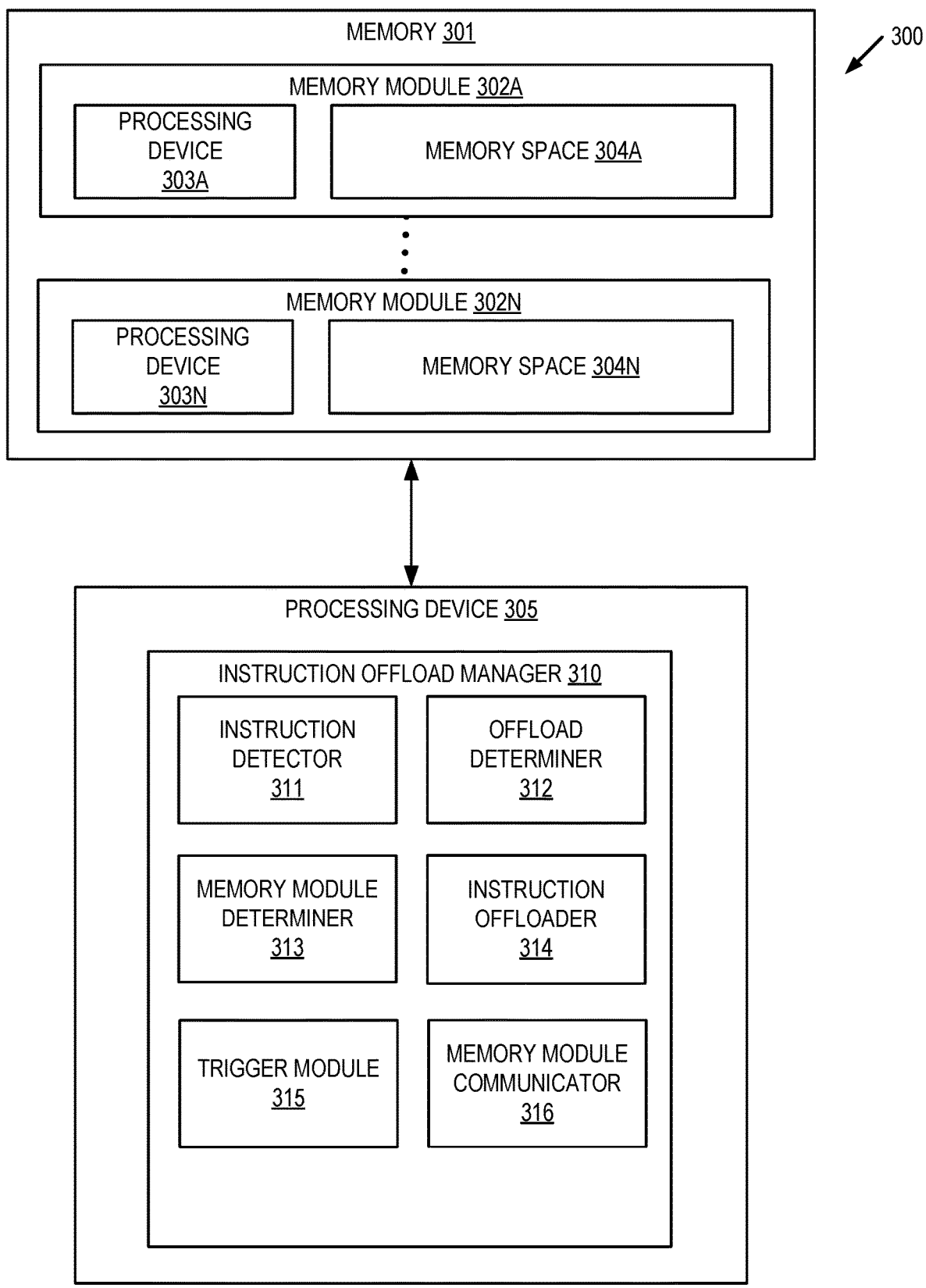
FIG. 3 depicts a block diagram illustrating an example of an instruction offload manager for facilitating instruction offload during program execution, in accordance with one or more aspects of the present disclosure.

FIG. 3 depicts a block diagram illustrating an example of an instruction offload manager 310 for facilitating instruction offload during program execution. In some implementations, instruction offload manager 310 may correspond instruction offload manager 145 of FIG. 1. As noted above with respect to FIG. 1, in some implementations, instruction offload manager 310 may be included as a component of a Host OS. Alternatively, instruction offload manager 310 may be included within the Host CPU itself (e.g., processing device 305). As shown in FIG. 3, instruction offload manager 310 may be a component of a computing apparatus 300 that includes a processing device 305, operatively coupled to a memory 301, to execute instruction offload manager 310. In some implementations, processing device 305 and memory 301 may correspond to processing device 702 and main memory 704 respectively as described below with respect to FIG. 7.

In some implementations, memory 301 may include one or more memory modules 302A-302N. Each memory module 302 can include an embedded secondary processing device 303 and a corresponding memory space 304. Thus, the secondary processing device 303 can be operatively coupled to the memory space 304 of the corresponding memory module 302. In some implementations, the secondary processing device 303 can include the same instruction set architecture (ISA) as processing device 305. Thus, instructions of programs executing on processing device 305 can be offloaded (e.g., copied) to one of processing devices 303 without modification to the instructions themselves. In other words, an instruction offloaded to a processing device 303 can operate on a corresponding memory space 304 as if it were executing on processing device 305.

Instruction offload manager 310 may include instruction detector 311, offload determiner 312, memory module determiner 313, instruction offloader 314, trigger module 315, and memory module communicator 316. Alternatively, the functionality of one or more of instruction detector 311, offload determiner 312, memory module determiner 313, instruction offloader 314, trigger module 315, and memory module communicator 316 may be combined into a single module or divided into multiple sub-modules.

Instruction detector 315 is responsible for monitoring an executing program to detect the execution of instructions that may be eligible for offloading to initiate the offload determination at execution time. In some implementations, instruction detector 315 can receive a notification that the program is executing. Alternatively, instruction detector 315 can monitor an area of memory where the main program in stored (e.g., an area of memory 301, a cache area, etc.) to detect instruction execution. Alternatively, instruction detector 315 may receive a request to execute an instruction that may be eligible for offloading. In some implementations, responsive to receiving the request (or notification) instruction detector 315 may subsequently invoke offload determiner 312.

Offload determiner 312 is responsible for determining whether the detected instruction (or set of instructions) can be offloaded to a secondary processing device 203A-N embedded within one of memory modules 202A-N. As noted above, an instruction can be offloaded in instances where the instruction performs repetitive operations on large amounts of data stored on memory modules 202A-N. For example, instructions that can be offloaded can include arithmetic operations, logic operations, or the like. These types of instructions can be offloaded to a processing device 203A-N that is coupled to the same memory module as the memory space being operated on by the particular instruction. Thus, the processing device 203A-N can execute the instructions on the associated memory space 203 without transferring data to processing device 205.

In some implementations, as noted above, offload determiner 312 may be invoked while a program is executing (e.g., in response to detecting the execution of a program instruction). Offload determiner 312 can analyze attributes of the executing instruction (or set of instructions) to determine whether or not the instructions can be offloaded to one of processing devices 203A-N. To make this determination, offload determiner 312 may determine an instruction type for the detected instructions. For example, the instruction type can include a vector instruction type, a looping instruction type, an iterative instruction type, or the like. If the executing instruction satisfies an offloading eligibility threshold (e.g., if the instruction has an instruction type that can be offloaded), offload determiner 312 may designate the executing instruction for offloading.

In some implementations, offload determiner 312 can analyze the number of operations performed by the executing instructions. If the number of operations meets a threshold condition, offload determiner 312 can target that instruction for offloading. For example, an instruction (or set of instructions) configured to execute for a large number if iterations (e.g., a loop) against a particular set of data can be identified as eligible for offloading. Similarly, offload determiner 312 can analyze the amount of memory (e.g., the amount of data stored in adjacent memory addresses) modified by the associated instructions. If the amount of memory satisfies a threshold amount, offload determiner 312 can target those instructions for offloading. For example, an instruction (or set of instructions) configured to operate on a large number of memory addresses, can be identified as eligible for offloading. Moreover, offload determiner 312 can analyze the configuration of memory being updated by the executing instruction. For example, if the memory being updated by the executing instructions includes a linear range of memory addresses for the memory space, offload determiner 312 can target those instructions for offloading.

In some implementations, offload determiner 312 can identify instructions that can be offloaded by utilizing a pre-trained model which can be loaded by the operating system along with the actual program code. In such instances, the analysis described above can be conducted using the associated pre-trained model(s) to identify different categories or types of instructions that can be offloaded.

Memory module determiner 313 is responsible for determining one or more appropriate memory modules 302 to which to offload the identified instructions. In some implementations, memory module determiner 313 may be invoked responsive to determining that the executing instruction (or instructions) is eligible for offloading. In an illustrative example, memory module determiner 313 can first determine the area of memory 301 updated by the instructions identified as eligible for offloading. Subsequently, memory module determiner 313 can determine memory modules 302 that are associated with at least a portion of the identified memory area.

For example, memory module determiner 313 can translate the logical addresses of the memory area updated by the executing instruction(s) to a physical address associated with one or more of memory spaces 304. Memory module determiner 313 can subsequently identify the memory modules 302 associated with the applicable memory spaces 304 (e.g., the memory spaces 304 associated with the memory area updated by the executing instructions to be offloaded). Once the appropriate memory module has been identified, instruction offloader 314 may then be invoked to initiate the instruction offload process. In some implementations, memory module determiner 313 may identify more than one memory module 302 that stores data updated by the instructions to be offloaded. In such instances, memory module determiner 313 may target each of the applicable memory modules 302 to receive copies of the offloaded instructions for execution by the corresponding processing device 303.

Instruction offloader 314 is responsible for providing the identified instructions (e.g., the instructions eligible for offloading to one of memory modules 302) to the appropriate memory module 302 for subsequent execution by that memory module's corresponding processing device 303. In some implementations, instruction offloader 314 can provide the instructions to the memory module 302 by copying the instructions to an area of memory space 304 for that memory module 302. For example, memory module 302 can be configured such that memory space 304 includes a dedicated area for offloaded program instructions with the remainder of the memory space 304 available for other uses. In other implementations, instruction offloader 314 can send a memory location to the memory module 302 that identifies where the instructions are stored. The memory module 302 can then access the memory location to execute the offloaded instruction. For example, memory module 302 can subsequently fetch the instructions and store them locally, or alternatively, execute the instructions from the received memory location.

In some implementations, instruction offloader 314 can annotate the area of memory storing the program (e.g., memory 301, a cache area where the program is loaded, etc.) to indicate whether particular instructions have been offloaded. In various implementations, the annotation can be stored in a cache area of memory 301. For example, a register or memory address associated with the offloaded instructions can be modified to indicate to processing device 305 that those instructions should execute on one or more of processing devices 303 rather than processing device 305. If the program subsequently executes those instructions again, control may be transferred to the appropriate memory module 302 without repeating the above analysis.

Memory module communicator 316 is responsible for communicating with the memory modules 302 to initiate execution of any offloaded instructions as well as receiving responses that indicate the success or failure of the execution of those instructions. In some implementations, memory module communicator 316 can send a notification to the processing device 303 of the applicable memory modules 302 to cause the processing device 303 to execute the offloaded instructions. As noted above, processing device 303 can execute the offloaded instructions to update the corresponding memory space 304 for that memory module 302. For example, if the offload determiner 312 had determined that the instructions should be offloaded to two memory modules 302A and 302B based on the analysis of the memory to be updated by the executing instruction, memory module communicator 312 can send notifications to both memory modules such that processing device 303A can execute the offloaded instructions to update memory space 304A, and processing device 303B can execute the offloaded instructions to update memory space 304B. In implementations where instruction offload manager 310 is incorporated into processing device 305 (rather than part of a Host OS) the notifications can be facilitated by using commands sent over the memory bus to memory 301.

In some implementations, memory module communicator 316 can send the notification by sending a request to the processing device 303 for the appropriate memory module 302 to execute the offloaded instructions. Alternatively, memory module communicator 316 can modify an area of memory that is accessible by the memory module 302 that causes the processing device 303 to execute the offloaded instructions. For example, memory module communicator 316 can modify a memory address that is monitored by each of the processing devices 303 to signal when to execute the offloaded instructions. In some implementations, each offloaded instruction may be associated with a separate memory address so that the instructions can be managed independently. In such cases, the memory address can be a flag set to execute or not. Alternatively, a single memory area may be used to indicate which instruction or instructions to execute as well as the memory addresses to be operated upon by the instructions. In other implementations, memory module communicator 316 can send a notification to the processing device 303 that indicates a starting address of the data to be updated by the offloaded instruction as well as an amount of data to update (e.g., a list of addresses to process, a number of data items to process, etc.).

Memory module communicator 316 can additionally receive responses from any of the memory modules 302 that indicate the status of the offloaded instructions. For example, if the instructions complete execution successfully, memory module communicator 316 may receive a notification from the appropriate processing device 303 that indicates that the offloaded instructions have been executed. Alternatively, memory module communicator 316 may detect that a memory address associated with the execution status of the instructions has been updated by the applicable processing device 303. Instruction offload manager 310 may subsequently indicate to the main program that the offloaded instructions have completed so that execution can continue.

In some implementations, instruction offload manager 310 may take additional action if the offloaded instructions should fail to execute. In various implementations, the offloaded instructions may fail to execute because of a data related problem, a communication problem, because the processing device 303 was busy executing another task, or the like. Responsive to receiving a notification from a processing device 303 that the offloaded instructions cannot be executed by that processing device, instruction offload manager 310 can indicate to the main program that the offloaded instructions are to be executed by processing device 305. Instruction offload manager 310 may take similar action in the event that the executing instruction is ineligible for offloading. For example, responsive to offload determiner 312 making a determination that the instruction type of executing instruction does not satisfy the offloading eligibility threshold, instruction offload manager 310 can indicate to the main program that the offloaded instructions are to be executed by processing device 305.

Trigger module 315 is responsible for configuring one or more portions of memory 301 to automatically trigger subsequent execution of offloaded instructions. Once an executing instruction has been targeted for offloading and the offloading process has provided the instructions to one or more of the processing devices 303, trigger module 315 can configure subsequent execution of the offloaded instructions if any portion of the applicable memory space 304 has been updated. In one illustrative example, trigger module 315 can detect an update to at least one memory address of a linear range of memory addresses for a memory space 304. Subsequently, trigger module 315 can send a notification to the associated processing device 303 to execute the offloaded instructions to update the remaining memory addresses of the range. In an illustrative example, when one address of memory space 304 is updated (e.g., one data element stored in that range of addresses), trigger module 315 can trigger the execution of a vector instruction by processing device 303 to update the remaining addresses (e.g., the remaining data elements stored in that range of addresses).

In another example, trigger module 315 can configure subsequent execution of the offloaded instructions in view of the location of the offloaded instructions. In some implementations, the mapping of the operations to be performed can vary from one execution of the instruction to another since the base addresses for the factors can differ. In such instances, trigger module 315 can determine whether the memory accessed is associated with a memory space 304 or with another portion of memory accessible to processing device 305. If the memory accessed is associated with one of the memory spaces 304, then trigger module 315 can perform the offloaded operation using the associated processing device 303.

Figure 4:
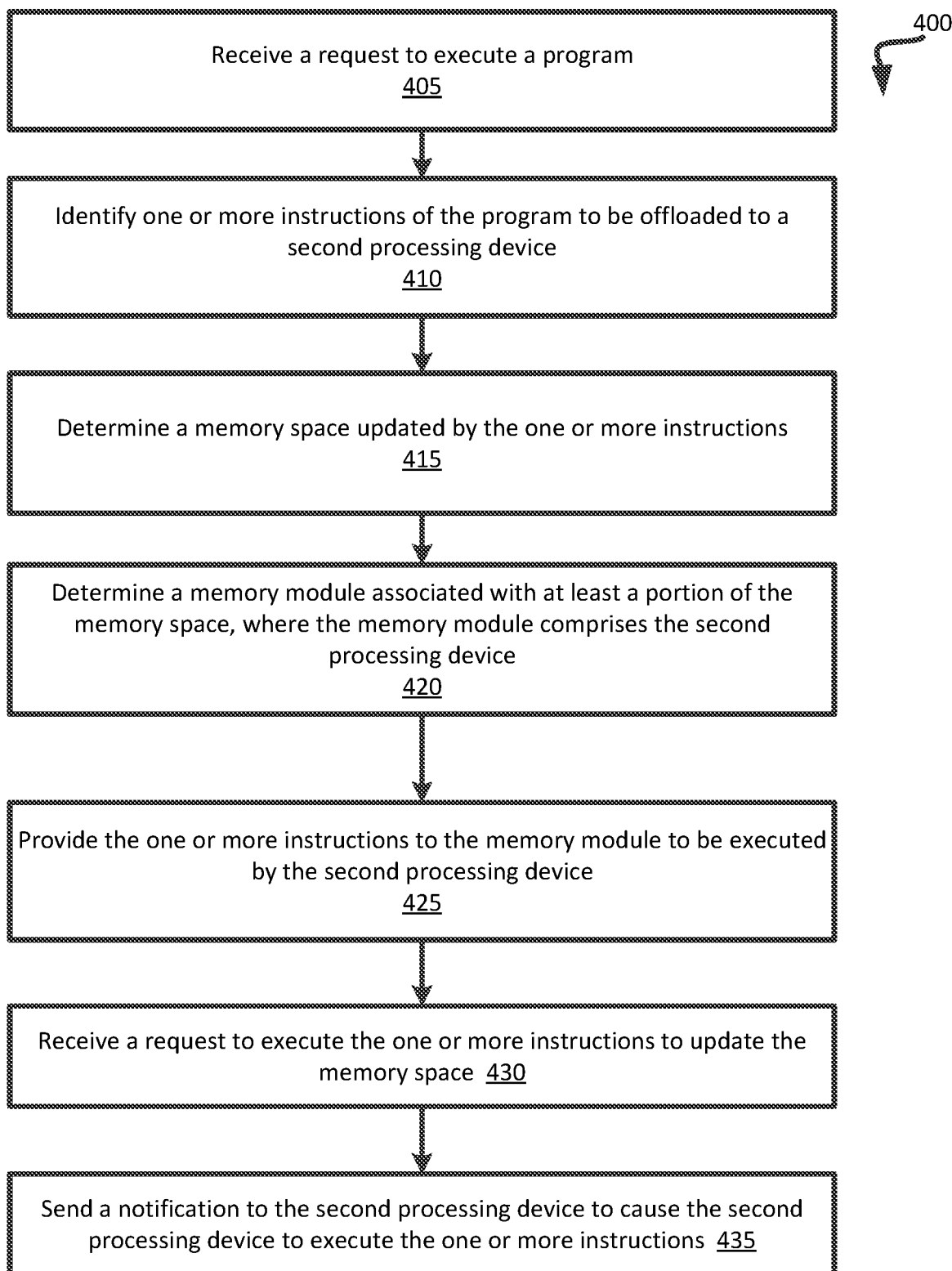
FIG. 4 depicts a flow diagram of a method for facilitating instruction offload prior to program execution, in accordance with one or more aspects of the present disclosure.

FIG. 4 depicts a flow diagram of an example method 400 for facilitating instruction offload prior to program execution. The method may be performed by processing logic that may comprise hardware (circuitry, dedicated logic, etc.), computer readable instructions (run on a general purpose computer system or a dedicated machine), or a combination of both. In an illustrative example, method 400 may be performed by instruction offload manager 145 in FIG. 1, or instruction offload manager 210 in FIG. 2. Alternatively, some or all of method 400 might be performed by another module or machine. It should be noted that blocks depicted in FIG. 4 could be performed simultaneously or in a different order than that depicted.

At block 405, processing logic receives a request to execute a program. At block 410, processing logic, responsive to receiving the request at block 405, identifies one or more instructions of the program to be offloaded to a second processing device. In some implementations, the second processing device includes the same instruction set architecture as the processing device executing the method 400. At block 415, processing logic determines a memory space updated by the one or more instructions.

At block 420, processing logic determines a memory module associated with at least a portion of the memory space, where the memory module includes an embedded processing device (e.g., the second processing device). At block 425, processing logic provides the one or more instructions to the memory module to be executed by the second processing device. In various embodiments, blocks 410 through 425 may be repeated to prepare multiple instructions (or set of instructions) for offloading to more than one memory module with an embedded processing device. In such instances blocks 410 through 425 may be performed until then entire program has been analyzed and any instruction that can be offloaded has been prepared for offloading.

At block 430, processing logic receives a request to execute the one or more instructions offloaded at block 425. At block 435, processing logic sends a notification to the second processing device to cause the second processing device to execute the one or more instructions offloaded at block 425, where the offloaded instructions update the memory space of the memory module. In various embodiments, blocks 430 through 435 may be repeated during the execution of the program. In an illustrative example, the program may repeat the same instructions (e.g., looping, iteratively, etc.), and thus some instructions may be offloaded multiple times. Moreover, some instructions may be offloaded to different memory modules during the program's execution. After block 435, the method of FIG. 4 terminates.

Figure 5:
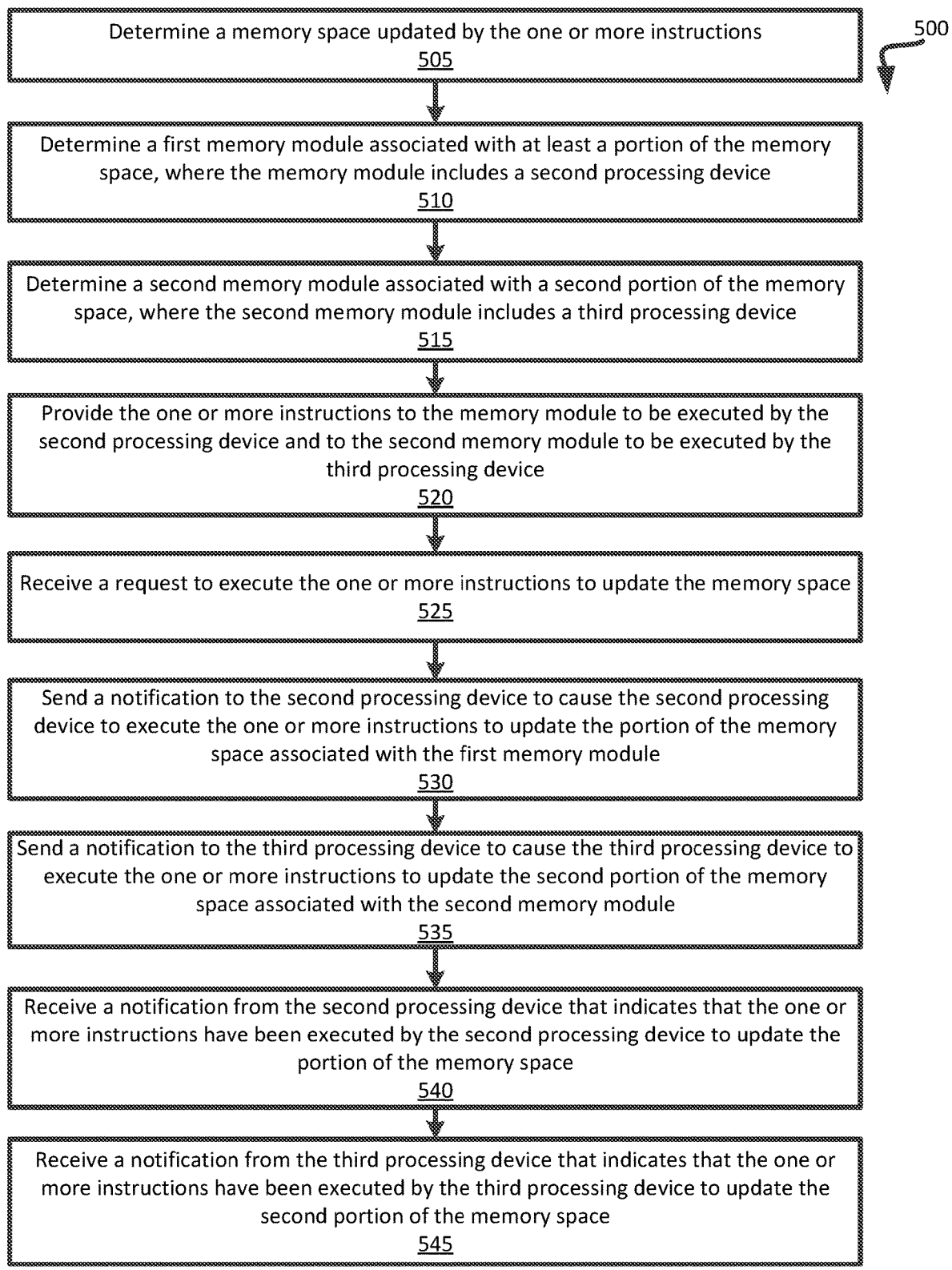
FIG. 5 depicts a flow diagram of a method for facilitating instruction offload to multiple memory modules, in accordance with one or more aspects of the present disclosure.

FIG. 5 depicts a flow diagram of an example method 500 for facilitating instruction offload to multiple memory modules. The method may be performed by processing logic that may comprise hardware (circuitry, dedicated logic, etc.), computer readable instructions (run on a general purpose computer system or a dedicated machine), or a combination of both. In an illustrative example, method 500 may be performed by instruction offload manager 145 in FIG. 1, or instruction offload manager 210 in FIG. 2. Alternatively, some or all of method 500 might be performed by another module or machine. It should be noted that blocks depicted in FIG. 5 could be performed simultaneously or in a different order than that depicted.

At block 505, processing logic determines a memory space updated by one or more instructions of a program. At block 510, processing logic determines a first memory module associated with at least a portion of the memory space, where the memory module includes a second processing device. At block 515, processing logic determines a second memory module associated with a second portion of the memory space, wherein the second memory module comprises a third processing device. At block 520, processing logic provides the one or more instructions to the first memory module to be executed by the second processing device and to the second memory module to be executed by the third processing device. In some implementations, the processing logic may provide additional information to the memory module along with the one or more instructions. For example, the processing logic may provide information to allow the second and third processing devices to interpret the instructions, register content, map virtual addresses to physical addresses, or the like.

At block 525, processing logic receives a request to execute the one or more instructions to update the memory space. At block 530, processing logic sends a notification to the second processing device to cause the second processing device to execute the one or more instructions to update the portion of the memory space of the first memory module. At block 535, processing logic sends a notification to the third processing device to cause the third processing device to execute the one or more instructions to update the second portion of the memory space of the second memory module. At block 540, processing logic receives a notification from the second processing device that indicates that the one or more instructions have been executed by the second processing device. At block 545, processing logic receives a notification from the third processing device that the one or more instructions have been executed by the third processing device to update the second portion of the memory space. After block 545, the method of FIG. 5 terminates.

Figure 6:
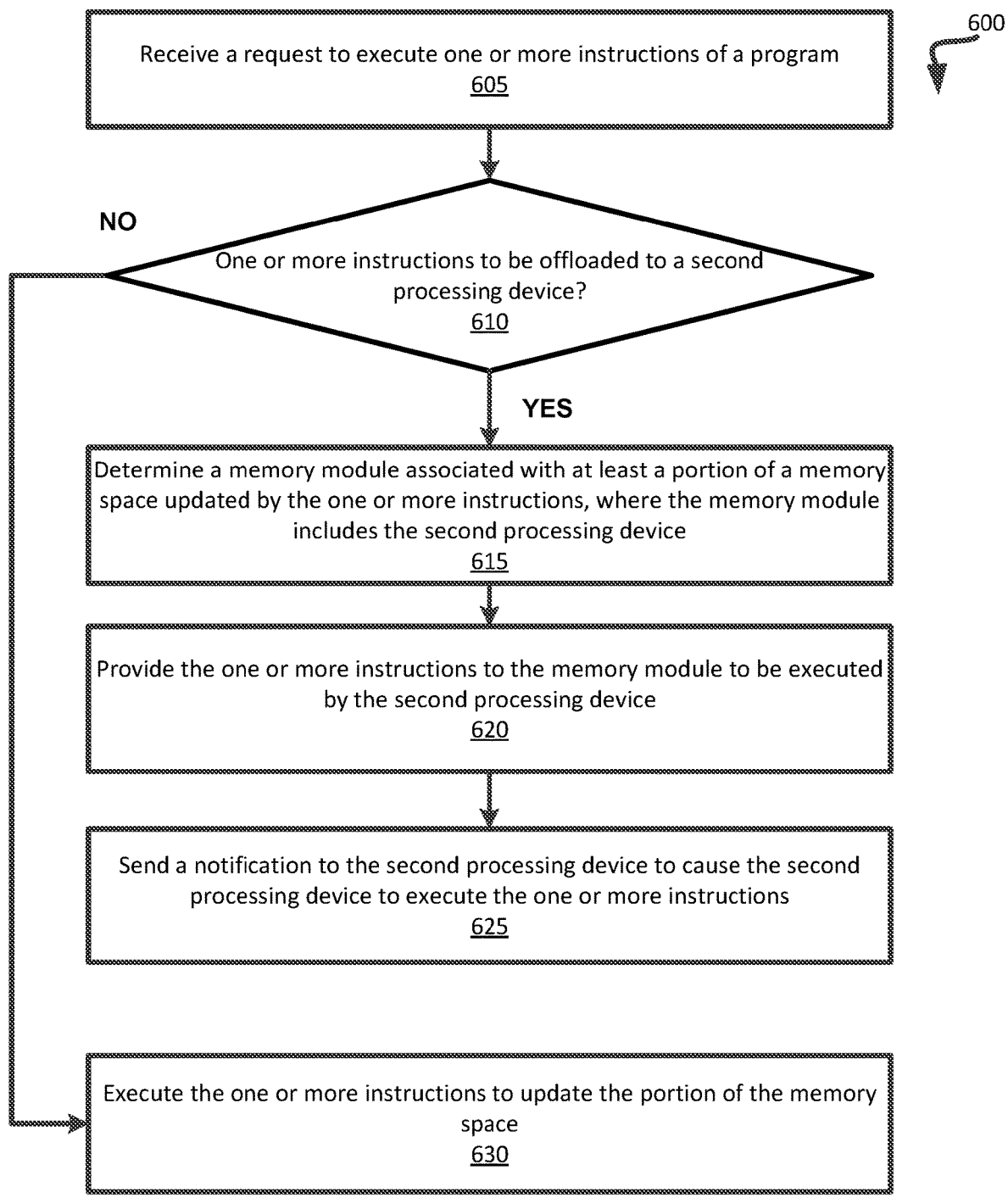
FIG. 6 depicts a flow diagram of a method for facilitating instruction offload during program execution, in accordance with one or more aspects of the present disclosure.

FIG. 6 depicts a flow diagram of an example method 600 for facilitating instruction offload during program execution. The method may be performed by processing logic that may comprise hardware (circuitry, dedicated logic, etc.), computer readable instructions (run on a general purpose computer system or a dedicated machine), or a combination of both. In an illustrative example, method 600 may be performed by instruction offload manager 145 in FIG. 1, or instruction offload manager 310 in FIG. 3 Alternatively, some or all of method 600 might be performed by another module or machine. It should be noted that blocks depicted in FIG. 6 could be performed simultaneously or in a different order than that depicted.

At block 605, processing logic receives a request to execute one or more instructions of a program. At block 610, processing logic determines whether the one or more instructions of the program are to be offloaded to a second processing device. If so, processing continues to block 615. Otherwise, processing proceeds to block 630. At block 615, processing logic determines a memory module associated with at least a portion of a memory space updated by the one or more instructions, where the memory module includes the second processing device. At block 620, processing logic provides the one or more instructions to the memory module to be executed by the second processing device. At block 625, processing logic sends a notification to the second processing device to cause the second processing device to execute the one or more instructions offloaded at block 620, where the offloaded instructions update the portion of the memory space of the memory module. After block 625, the method of FIG. 6 terminates. In some implementations, blocks 610 through 625 can be repeated for each additional instruction of the program until the end of the program is reached.

If at block 610, processing logic determines that the one or more instructions cannot be offloaded to the second processing device, processing proceeds to block 630. At block 630, processing logic executes the one or more instructions using the processing device executing method 600. After block 630, the method of FIG. 6 terminates. In some implementations, as noted above, processing can return to block 610 to repeat the method 600 for each additional instruction of the program until the end of the program is reached.

Figure 7:
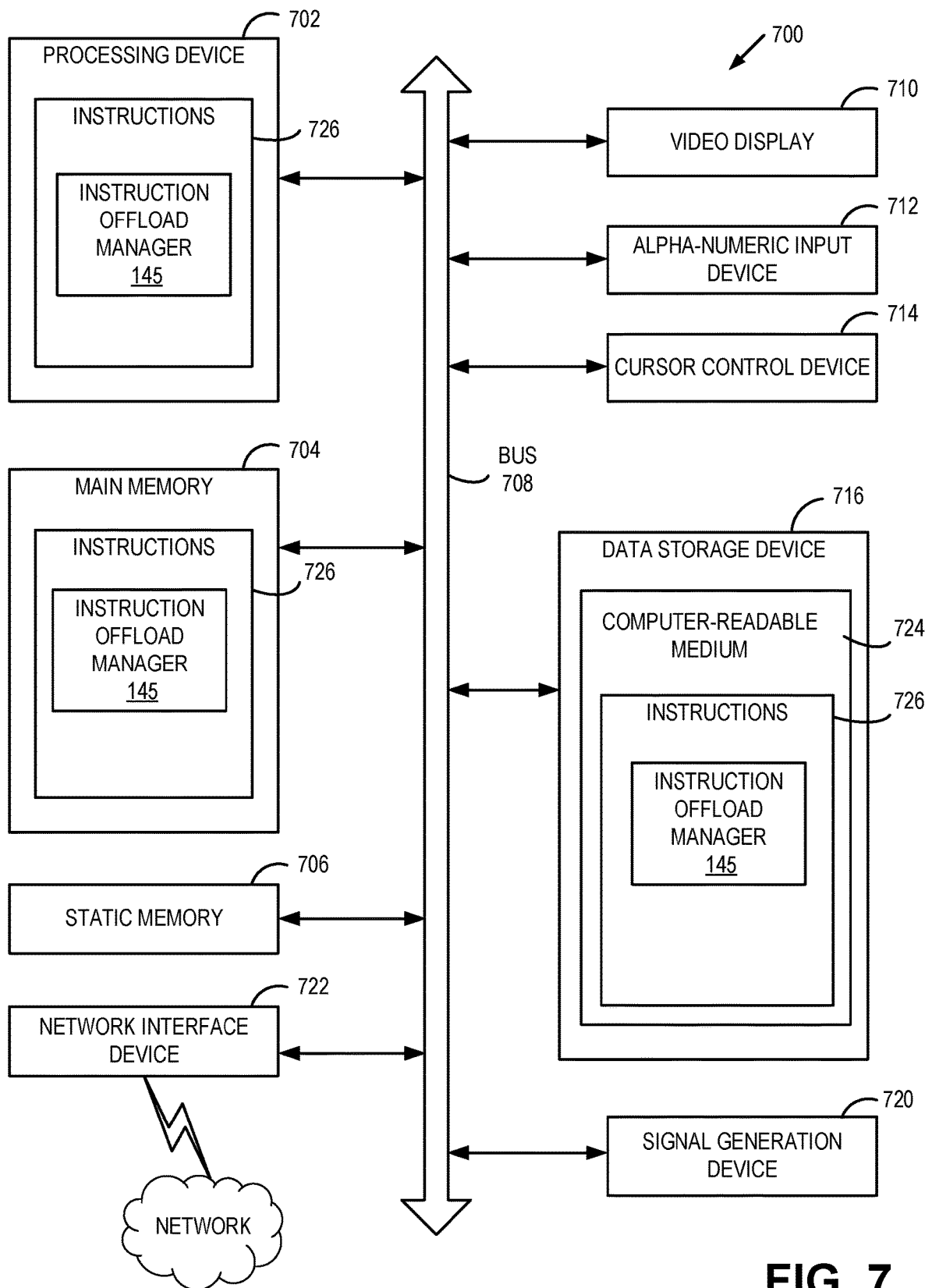
FIG. 7 depicts a block diagram of an illustrative computer system operating in accordance with one or more aspects of the present disclosure.

FIG. 7 depicts an example computer system 700 which can perform any one or more of the methods described herein. In one example, computer system 700 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while a single computer system is illustrated, the term "computer" shall also be taken to include any collection of computers that individually or jointly execute a set (or multiple sets) of instructions to perform any one or more of the methods discussed herein.

The exemplary computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic (e.g., instructions 726) that includes instruction offload manager 145 for performing the operations and steps discussed herein (e.g., corresponding to the methods of FIGS. 4-6, etc.).

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker). In one illustrative example, the video display unit 710, the alphanumeric input device 712, and the cursor control device 714 may be combined into a single component or device (e.g., an LCD touch screen).

The data storage device 716 may include a non-transitory computer-readable medium 724 on which may store instructions 726 that include instruction offload manager 145 (e.g., corresponding to the methods of FIGS. 4-6, etc.) embodying any one or more of the methodologies or functions described herein. Instruction offload manager 145 may also reside, completely or at least partially, within the main memory 704 and/or within the processing device 702 during execution thereof by the computer system 700, the main memory 704 and the processing device 702 also constituting computer-readable media. Instruction offload manager 145 may further be transmitted or received over a network via the network interface device 722.

While the computer-readable storage medium 724 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that aspects of the present disclosure may be practiced without these specific details. In some instances, well-known structures and devices are shown in block diagram form, rather than in detail, in order to avoid obscuring the present disclosure.

Unless specifically stated otherwise, as apparent from the following discussion, it is appreciated that throughout the description, discussions utilizing terms such as "receiving," "determining," "identifying," "providing," "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the specific purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Aspects of the disclosure presented herein are not inherently related to any particular computer or other apparatus. Various general purpose systems may be used with programs in accordance with the teachings herein, or it may prove convenient to construct more specialized apparatus to perform the specified method steps. The structure for a variety of these systems will appear as set forth in the description below. In addition, aspects of the present disclosure are not described with reference to any particular programming language. It will be appreciated that a variety of programming languages may be used to implement the teachings of the disclosure as described herein.

Aspects of the present disclosure may be provided as a computer program product that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not have an ordinal meaning according to their numerical designation.

Other computer system designs and configurations may also be suitable to implement the system and methods described herein. The following examples illustrate various implementations in accordance with one or more aspects of the present disclosure.

Example 1 is a method comprising receiving, by a processing device, a first request to execute a program; identifying one or more instructions of the program to be offloaded to a second processing device, wherein the processing device comprises a same instruction set architecture as the second processing device; providing the one or more instructions to a memory module comprising the second processing device; and responsive to detecting an indication to execute the one or more instructions, causing, by the processing device, the second processing device to execute the one or more instructions, the one or more instructions to update a portion of a memory space associated with the memory module.

Example 2 is the method of Example 1, wherein identifying the one or more instructions of the program to be offloaded further comprises identifying metadata information embedded in the program associated with the one or more instructions; and determining that the metadata indicates that the one or more instructions of the program are to be offloaded to the second processing device.

Example 3 is the method of Example 1, wherein identifying the one or more instructions of the program to be offloaded comprises determining that a number of operations performed by the one or more instructions satisfies a threshold number.

Example 4 is the method of Example 1, wherein providing the one or more instructions to the memory module further comprises determining a memory space updated by the one or more instructions; and determining a memory module associated with at least a portion of the memory space, wherein the memory module comprises the second processing device.

Example 5 is the method of Example 4, wherein providing the one or more instructions to the memory module comprises at least one of copying the one or more instructions to a memory area of the memory module, or sending a memory location of the one or more instructions to the memory module.

Example 6 is the method of Example 1, wherein causing the second processing device to execute the one or more instructions comprises at least one of sending a request to the second processing device to execute the one or more instructions, or modifying an area of memory of the memory module to cause the second processing device to execute the one or more instructions.

Example 7 is the method of Example 1, further comprising receiving a second notification from the second processing device that indicates that the one or more instructions are not to be executed by the second processing device to update the portion of the memory space; and executing the one or more instructions by the processing device to update the portion of the memory space.

Example 8 is the method of Example 1, further comprising receiving a second notification from the second processing device that indicates that the one or more instructions have been executed by the second processing device to update the portion of the memory space.

Example 9 is the method Example 8, further comprising determining a second memory module associated with a second portion of the memory space, wherein the second memory module comprises a third processing device; providing the one or more instructions to the second memory module to be executed by the third processing device; responsive to detecting the indication to execute the one or more instructions, sending a third notification to the third processing device to cause the third processing device to execute the one or more instructions, the one or more instructions to update the second portion of the memory space of the second memory module; and receiving a fourth notification from the third processing device that indicates that the one more instructions have been executed by the third processing device to update the second portion of the memory space.

Example 10 is a system comprising a memory, comprising one or more memory modules, and a processing device, operatively coupled to the memory, to: receive a first request to execute one or more instructions of a program; and responsive to determining that the one or more instructions of the program are to be offloaded to a second processing device, wherein the second processing device comprises a same instruction set architecture as the processing device: determine a memory module associated with at least a portion of a memory space updated by the one or more instructions, wherein the memory module comprises the second processing device; provide, to the memory module, the one or more instructions to be executed by the second processing device; and provide, to the second processing device, an indication to cause the second processing device to execute the one or more instructions to update the portion of the memory space of the memory module.

Example 11 is the system of Example 10, wherein the processing device is further to, responsive to determining that the one or more instructions are not to be offloaded to the second processing device, execute the one or more instructions to update the portion of the memory space.

Example 12 is the system of Example 10, wherein to determine that the one or more instructions of the program are to be offloaded to a second processing device, the processing device is to determine an instruction type for the one or more instructions; and determine that the one or more instructions satisfy an offloading eligibility threshold in view of the instruction type.

Example 13 is the system of Example 12, wherein the instruction type comprises at least one of a vector instruction type or a looping instruction type.

Example 14 is the system of Example 10, wherein to determine that the one or more instructions of the program are to be offloaded to a second processing device, the processing device is to determine that the portion of the memory space updated by the one or more instructions comprises a linear range of memory addresses for the memory module.

Example 15 is the system of Example 14, wherein the processing device is further to detect an update to at least one memory address of the linear range of memory addresses for the memory module; and send a second notification to the second processing device to cause the second processing device to execute the one or more instructions, the one or more instructions to update the remaining memory addresses of the linear range of memory addresses for the memory module.

Example 16 is the system of Example 10, wherein the processing device is further to: determine a second memory module associated with a second portion of the memory space updated by the one or more instructions, wherein the second memory module comprises a third processing device; provide the one or more instructions to the second memory module to be executed by the third processing device; send a second notification to the third processing device to cause the third processing device to execute the one or more instructions, the one or more instructions to update the second portion of the memory space of the second memory module; and receive a second response from the third processing device that indicates that the one more instructions have been executed by the third processing device to update the second portion of the memory space.

Example 17 is a non-transitory computer readable medium comprising instructions, which when accessed by a processing device, cause the processing device to receive a first request to execute a program; responsive to receiving the first request, identify one or more instructions of the program to be offloaded to a second processing device, wherein the processing device comprises a same instruction set architecture as the second processing device; provide the one or more instructions to a memory module comprising the second processing device; and responsive to receiving a second request to execute the one or more instructions, cause, by the processing device, the second processing device to execute the one or more instructions, the one or more instructions to update a portion of a memory space associated with the memory module.

Example 18 is the non-transitory computer readable medium of Example 17, wherein to provide the one or more instructions to the memory module, the processing device is further to determine a memory space updated by the one or more instructions; and determine the memory module associated with at least a portion of the memory space, wherein the memory module comprises the second processing device.

Example 19 is the non-transitory computer readable medium of Example 17, wherein the processing device is further to receive a second notification from the second processing device that indicates that the one or more instructions have been executed by the second processing device to update the portion of the memory space.

Example 20 is the non-transitory computer readable medium of Example 19, wherein the processing device is further to determine a second memory module associated with a second portion of the memory space, wherein the second memory module comprises a third processing device; provide the one or more instructions to the second memory module to be executed by the third processing device; responsive to receiving the second request to execute the one or more instructions, sending a third notification to the third processing device to cause the third processing device to execute the one or more instructions, the one or more instructions to update the second portion of the memory space of the second memory module; and receive a fourth notification from the third processing device that indicates that the one more instructions have been executed by the third processing device to update the second portion of the memory space.

Example 21 is the non-transitory computer readable medium of Example 17, wherein to identify the one or more instructions of the program to be offloaded, the processing device is to identify metadata information embedded in the program associated with the one or more instructions; and determine that the metadata indicates that the one or more instructions of the program are to be offloaded to the second processing device.

Example 22 is the non-transitory computer readable medium of Example 17, wherein to identify the one or more instructions of the program to be offloaded, the processing device is to determine that a number of operations performed by the one or more instructions satisfies a threshold number.

Example 23 is the non-transitory computer readable medium of Example 17, wherein to provide the one or more instructions to the memory module, the processing device is to at least one of copy the one or more instructions to a memory area of the memory module, or send a memory location of the one or more instructions to the memory module.

Example 24 is the non-transitory computer readable medium of Example 17, wherein to send the notification to the second processing device, the processing device is to at least one of send a request to the second processing device to execute the one or more instructions, or modify an area of memory of the memory module to cause the second processing device to execute the one or more instructions.

Example 25 is the non-transitory computer readable medium of Example 17, wherein the processing device is further to receive a second notification from the second processing device that indicates that the one or more instructions are not to be executed by the second processing device to update the portion of the memory space; and execute the one or more instructions by the processing device to update the portion of the memory space.

Example 26 is a method comprising receiving, by a processing device, a first indication to execute one or more instructions of a program; determining whether the one or more instructions of the program are to be offloaded to a second processing device, wherein the second processing device comprises a same instruction set architecture as the processing device; responsive to determining that the one or more instructions are to be offloaded to the second processing device: determining a memory module associated with at least a portion of a memory space updated by the one or more instructions, wherein the memory module comprises the second processing device; providing, to the memory module, the one or more instructions to be executed by the second processing device; and sending, by the processing device, a notification to the second processing device to cause the second processing device to execute the one or more instructions, the one or more instructions to update the portion of the memory space of the memory module; and responsive to determining that the one or more instructions are not to be offloaded to the second processing device, executing, by the processing device, the one or more instructions to update the portion of the memory space.

Example 27 is the method of Example 26, further comprising receiving a response from the second processing device that indicates that the one more instructions have been executed by the second processing device to update the portion of the memory space.

Example 28 is the method of Example 26, wherein determining that the one or more instructions of the program are to be offloaded to a second processing device comprises determining an instruction type for the one or more instructions; and determining that the one or more instructions satisfy an offloading eligibility threshold in view of the instruction type.

Example 29 is the method of Example 28, wherein the instruction type comprises at least one of a vector instruction type or a looping instruction type.

Example 30 is the method of Example 26, wherein determining that the one or more instructions of the program are to be offloaded to a second processing device comprises determining that the portion of the memory space updated by the one or more instructions comprises a linear range of memory addresses for the memory module.

Example 31 is the method of Example 30, further comprising detecting an update to at least one memory address of the linear range of memory addresses for the memory module; and sending a second notification to the second processing device to cause the second processing device to execute the one or more instructions, the one or more instructions to update the remaining memory addresses of the linear range of memory addresses for the memory module.

Example 32 is the method of Example 26, further comprising determining a second memory module associated with a second portion of the memory space updated by the one or more instructions, wherein the second memory module comprises a third processing device; providing the one or more instructions to the second memory module to be executed by the third processing device; sending a second notification to the third processing device to cause the third processing device to execute the one or more instructions, the one or more instructions to update the second portion of the memory space of the second memory module; and receiving a second response from the third processing device that indicates that the one more instructions have been executed by the third processing device to update the second portion of the memory space.

Example 33 is an apparatus comprising means for receiving a first request to execute a program; means for identifying one or more instructions of the program to be offloaded to a second processing device; means for determining a memory space updated by the one or more instructions; means for determining a memory module associated with at least a portion of the memory space, wherein the memory module comprises the second processing device; means for providing, to the memory module, the one or more instructions to be executed by the second processing device; means for receiving a second request to execute the one or more instructions to update the memory space; and means for sending a notification to the second processing device to cause the second processing device to execute the one or more instructions, the one or more instructions to update the portion of the memory space of the memory module.

What is claimed is:

1. A method comprising:
    receiving, by a first processing device, a request to execute a program;
    identifying metadata embedded into the program, wherein the metadata specifies an amount of memory modified by one or more instructions of the program;
    determining that the amount of memory modified by the one or more instructions satisfies a threshold criterion;
    responsive to determining that the amount of memory modified by the one or more instructions satisfies the threshold criterion,
    providing the one or more instructions to a memory module comprising a second processing device implementing an instruction set architecture of the first processing device; and
    responsive to detecting an indication to execute the one or more instructions, causing, by the first processing device, the second processing device to execute the one or more instructions, the one or more instructions to update a portion of a memory space associated with the memory module.

2. The method of claim 1, further comprising:
    determining that a number of operations performed by the one or more instructions satisfies a threshold number.

3. The method of claim 1, wherein providing the one or more instructions to the memory module further comprises:
    determining a memory space updated by the one or more instructions; and
    determining a memory module associated with at least a portion of the memory space, wherein the memory module comprises the second processing device.

4. The method of claim 3, wherein providing the one or more instructions to the memory module comprises at least one of copying the one or more instructions to a memory area of the memory module, or sending a memory location of the one or more instructions to the memory module.

5. The method of claim 1, wherein causing the second processing device to execute the one or more instructions comprises at least one of sending a request to the second processing device to execute the one or more instructions, or modifying an area of memory of the memory module to cause the second processing device to execute the one or more instructions.

6. The method of claim 1, further comprising:
    receiving a second notification from the second processing device that indicates that the one or more instructions are not to be executed by the second processing device to update the portion of the memory space; and
    executing the one or more instructions by the first processing device to update the portion of the memory space.

7. The method of claim 1, further comprising:
    receiving a second notification from the second processing device that indicates that the one or more instructions have been executed by the second processing device to update the portion of the memory space.

8. The method of claim 7, further comprising:
    determining a second memory module associated with a second portion of the memory space, wherein the second memory module comprises a third processing device;
    providing the one or more instructions to the second memory module to be executed by the third processing device;
    responsive to detecting the indication to execute the one or more instructions, sending a third notification to the third processing device to cause the third processing device to execute the one or more instructions, the one or more instructions to update the second portion of the memory space of the second memory module; and
    receiving a fourth notification from the third processing device that indicates that the one more instructions have been executed by the third processing device to update the second portion of the memory space.

9. A system comprising:
a memory comprising one or more memory modules; and
a first processing device, operatively coupled to the memory, to:
receive a request to execute one or more instructions of a program;
identify metadata embedded into the program, wherein the metadata specifies an amount of memory modified by the one or more instructions;
determine that the amount of memory modified by the one or more instructions satisfies a threshold criterion;
responsive to determining that the amount of memory modified by the one or more instructions satisfies the threshold criterion, determining that the one or more instructions of the program are to be offloaded to a second processing device implementing an instruction set architecture of the first processing device;
responsive to determining that the one or more instructions of the program are to be offloaded to the second processing device:
determine a memory module associated with at least a portion of a memory space updated by the one or more instructions, wherein the memory module comprises the second processing device;
provide, to the memory module, the one or more instructions to be executed by the second processing device; and
provide, to the second processing device, an indication to cause the second processing device to execute the one or more instructions to update the portion of the memory space of the memory module.

10. The system of claim 9, wherein the first processing device is further to:
responsive to determining that the one or more instructions are not to be offloaded to the second processing device, execute the one or more instructions to update the portion of the memory space.

11. The system of claim 9, wherein to determine that the one or more instructions of the program are to be offloaded to the second processing device, the first processing device is to:
determine an instruction type for the one or more instructions; and
determine that the one or more instructions satisfy an offloading eligibility threshold in view of the instruction type.

12. The system of claim 11, wherein the instruction type comprises at least one of a vector instruction type or a looping instruction type.

13. The system of claim 9, wherein to determine that the one or more instructions of the program are to be offloaded to the second processing device, the first processing device is to:
determine that the portion of the memory space updated by the one or more instructions comprises a linear range of memory addresses for the memory module.

14. The system of claim 13, wherein the first processing device is further to:
detect an update to at least one memory address of the linear range of memory addresses for the memory module; and
send a second notification to the second processing device to cause the second processing device to execute the one or more instructions, the one or more instructions to update the remaining memory addresses of the linear range of memory addresses for the memory module.

15. The system of claim 9, wherein the first processing device is further to:
determine a second memory module associated with a second portion of the memory space updated by the one or more instructions, wherein the second memory module comprises a third processing device;
provide the one or more instructions to the second memory module to be executed by the third processing device;
send a second notification to the third processing device to cause the third processing device to execute the one or more instructions, the one or more instructions to update the second portion of the memory space of the second memory module; and
receive a second response from the third processing device that indicates that the one more instructions have been executed by the third processing device to update the second portion of the memory space.

16. A non-transitory computer readable medium comprising instructions, which when accessed by a first processing device, cause the first processing device to:
receive a first request to execute a program;
identify metadata embedded into the program, wherein the metadata specifies an amount of memory modified by one or more instructions of the program;
determine that the amount of memory modified by the one or more instructions satisfies a threshold criterion;
responsive to determining that the amount of memory modified by the one or more instructions satisfies the threshold criterion;
provide the one or more instructions to a memory module comprising a second processing device implementing an instruction set architecture of the first processing device; and
responsive to receiving a second request to execute the one or more instructions, cause, by the first processing device, the second processing device to execute the one or more instructions, the one or more instructions to update a portion of a memory space associated with the memory module.

17. The non-transitory computer readable medium of claim 16, wherein to provide the one or more instructions to the memory module, the first processing device is further to:
determine a memory space updated by the one or more instructions; and
determine the memory module associated with at least a portion of the memory space, wherein the memory module comprises the second processing device.

18. The non-transitory computer readable medium of claim 16, wherein the first processing device is further to:
receive a second notification from the second processing device that indicates that the one or more instructions have been executed by the second processing device to update the portion of the memory space.

19. The non-transitory computer readable medium of claim 18, wherein the first processing device is further to:
determine a second memory module associated with a second portion of the memory space, wherein the second memory module comprises a third processing device;
provide the one or more instructions to the second memory module to be executed by the third processing device;
responsive to receiving the second request to execute the one or more instructions, send a third notification to the third processing device to cause the third processing device to execute the one or more instructions, the one or more instructions to update the second portion of the memory space of the second memory module; and
receive a fourth notification from the third processing device that indicates that the one more instructions have been executed by the third processing device to update the second portion of the memory space.

* * * * *